United States Patent
Champion et al.

(10) Patent No.: US 7,405,018 B2
(45) Date of Patent: Jul. 29, 2008

(54) FUEL CELL WITH CATALYTIC COMBUSTOR SEAL

(75) Inventors: David Champion, Lebanon, OR (US);
Gregory S Herman, Albany, OR (US);
Peter Mardilovich, Corvallis, OR (US);
Niranjan Thirukkovalur, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 715 days.

(21) Appl. No.: 10/367,464

(22) Filed: Feb. 14, 2003

(65) Prior Publication Data

US 2004/0161648 A1     Aug. 19, 2004

(51) Int. Cl.
*H01M 8/04*     (2006.01)

(52) U.S. Cl. ............................ 429/35; 429/34; 429/38; 429/26

(58) Field of Classification Search .............. 429/26, 429/34, 35, 38
See application file for complete search history.

(56) References Cited

U.S. PATENT DOCUMENTS

| | | | |
|---|---|---|---|
| 4,374,184 A | 2/1983 | Somers et al. | |
| 4,910,100 A * | 3/1990 | Nakanishi et al. | 429/32 |
| 5,200,279 A | 4/1993 | Draper et al. | |
| 5,212,023 A | 5/1993 | Diethelm | |
| 5,549,983 A | 8/1996 | Yamanis | |
| 5,851,689 A * | 12/1998 | Chen | 429/13 |
| 5,932,366 A * | 8/1999 | Ringel | 429/26 |
| 6,124,053 A | 9/2000 | Jeffrey et al. | |
| 6,274,258 B1 | 8/2001 | Chen | |
| 6,280,869 B1 * | 8/2001 | Chen | 429/34 |
| 2002/0081472 A1 | 6/2002 | Kendall et al. | |
| 2003/0082423 A1 * | 5/2003 | Kushibiki et al. | 429/26 |

FOREIGN PATENT DOCUMENTS

| | | |
|---|---|---|
| EP | 1309027 | 5/2003 |
| JP | 2002093435 | 3/2002 |

\* cited by examiner

*Primary Examiner*—Mark Ruthkosky (57) ABSTRACT

Subject matter includes a fuel cell with a catalytic combustor seal and related methods. The catalytic converter is positioned to come in contact with a fuel after the fuel has traversed a path over an intended electrode and the fuel is catalytically converted before the fuel can come in contact with an unintended electrode.

35 Claims, 10 Drawing Sheets

FUEL CELL WITH CATALYTIC COMBUSTOR SEAL

TECHNICAL FIELD

This invention relates generally to electrochemical power systems, and more particularly to a fuel cell with a catalytic combustor seal.

BACKGROUND

Fuel cells, like batteries, have benefited from improvements in their design and in the materials from which they are made. Ceramic compounds of metal oxides have made portability and miniaturization of fuel cells more possible than ever before. However, several hurdles remain before the cost per kilowatt-hour of manufacturing a fuel cell will be competitive with the cost per kilowatt-hour of manufacturing conventional power generating devices, such as steam turbines for power plants; alternators and batteries for automobiles, etc.

Advances in the ceramic engineering and chemistry of solid electrolytes along with similar advances in the chemical and physical properties of electrodes have resulted in more efficient fuel cell power production and miserly use of fuel. Solid oxide fuel cells (SOFCs) are truly solid state since they require no liquid phase to transport charged anions from one electrode-electrolyte interface to the other. SOFCs can reduce production costs by simplifying design since corrosion is not a concern and the electrolyte has no parts or phases that need replacing: solid electrolytes can crack, but they cannot leak as there are no liquid species present.

One aspect of SOFCs that make them costly is the need for seals. In a dual chamber SOFC, for example, the fuel flow chamber of the anode has to be strictly sealed from the oxidizer flow chamber of the cathode, or else the fuel gases migrate to the cathode chamber, poisoning the cathode and diluting the oxidizer flow, thereby decreasing the efficiency of the cell. Both the anode and cathode can be poisoned via chemisorption of an unintended gas from the opposing chamber. The seals, which are often vulnerably rigid, must be able to withstand nominal 700° C. (400° C.-1000° C.) temperatures and still provide longevity without leaking or cracking. Single chamber SOFCs can produce power without the need for seals, but the electrode materials necessary to make a single chamber SOFC must be highly selective in order to produce significant power, which is not easily realized. Hence, there is a need to improve or eliminate seals in dual chamber SOFCs.

DETAILED DESCRIPTION

Subject matter and related methods include an exemplary two-chamber ("dual chamber") fuel cell that operates with no seals separating the anode chamber and the cathode chamber from each other but only a gas-permeable combustor. Because no seals separate the chambers (or only porous seals made of gas-permeable combustors), limitations imposed by seals on the longevity of the fuel cell are avoided. The lifespan of an exemplary fuel cell having a gas-permeable combustor as the "seal" can be unlimited because longevity is no longer dependent upon the durability of conventional seals. Conventional seals can usually withstand the high temperature and rigorous oxidation-reduction environment of fuel cells for only so long. These conventional seals eventually crack and fail, resulting in reduced efficiency and failure of the fuel cell.

The exemplary no-seal or porous-seal fuel cell (hereafter "no-seal fuel cell"), moreover, does not rely on expensive and difficult-to-manufacture electrodes to achieve a no-seal design. Although single chamber solid oxide fuel cells can achieve a no-seal design, they require electrodes having costly materials and construction.

The exemplary no-seal fuel cell can use the same relatively inexpensive electrodes as conventional fuel cells, but instead of sealing fuel flow from oxidizer flow so that these flows do not migrate to an unintended electrode and poison the electrode, the exemplary no-seal fuel cell neutralizes the fuel and oxidizer streams once they have traversed a path over their intended electrodes. Once neutralized, the products of the neutralization can be removed or leave on their own, but it is not significantly detrimental if they stay and some of the products come in contact with either electrode. In one implementation, the neutralizer is a catalytic combustor, forming products such as carbon dioxide and water that are harmless to anode and cathode since they are typically the same products that are already diffusing out of the electrodes as exhaust products of the fuel cell's electrochemical oxidation-reduction reactions.

Figure 1:
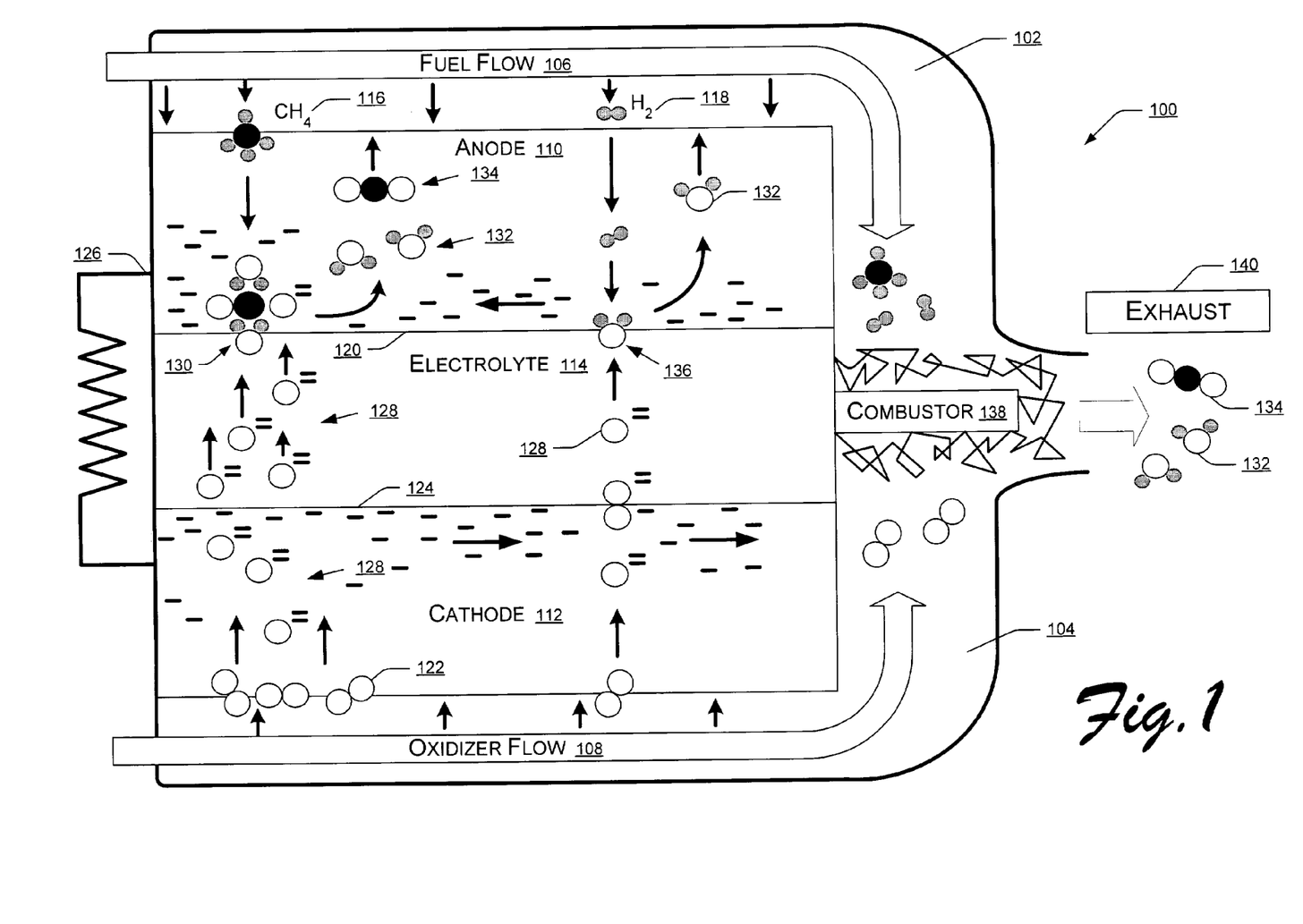
FIG. 1 is a diagram of an exemplary fuel cell with a gas-permeable combustor, according to one implementation of the subject matter.

FIG. 1 shows an exemplary no-seal dual chamber fuel cell 100 that includes an anode chamber 102 and a cathode chamber 104. The anode chamber 102 and the cathode chamber 104 are coupled to form a continuous space in the fuel cell 100, that is, gases are free to flow between the anode chamber 102 and the cathode chamber 104 because there is no seal separating the two chambers. A fuel flow 106 is introduced in the anode chamber 102 to present fuel (gases) to the surface of an anode 110, and an oxidizer flow 108 is introduced in the cathode chamber 104 to present oxidizer (gases) to a cathode 112.

It should be noted that an exemplary fuel cell 100 may be a solid oxide fuel cell (SOFC), a proton conducting ceramic fuel cell, an alkaline fuel cell, a polymer electrolyte membranes (PEM) fuel cell, a molten carbonate fuel cell, a solid acid fuel cell, or a direct methanol PEM fuel cell. The exemplary electrolyte 114 may be formed from any suitable electrolytic material. Various exemplary electrolytes include oxygen anion conducting membrane electrolytes, proton conducting electrolytes, carbonate ($CO_3^{2-}$) conducting electrolytes, $OH^-$ conducting electrolytes, and mixtures thereof.

Other exemplary electrolytes include cubic fluorite structure electrolytes, doped cubic fluorite electrolytes, proton-exchange polymer electrolytes, proton-exchange ceramic electrolytes, and mixtures thereof. Further, an exemplary electrolyte 114 can also be yttria-stabilized zirconia, samarium doped-ceria, gadolinium doped-ceria, $La_aSr_bGa_cMg_dO_{3-\partial}$, and mixtures thereof, which may be particularly suited for use in solid oxide fuel cells.

The exemplary anode 110 and exemplary cathode 112 are, in this implementation, substantially flat plates that "sandwich" an electrolyte 114 plate, such as a solid oxide electrolyte. The anode 110 and cathode 112 may be formed from any suitable material, as desired and/or necessitated by a particular end use. Various exemplary anodes and/or cathodes can be metal(s), ceramic(s) and/or cermet(s). Some non-limitative examples of metals which may be suitable for the exemplary anode 110 include at least one of nickel, platinum and mixtures thereof. Some non-limitative examples of ceramics which may be suitable for an anode 110 include at least one of $Ce_xSm_yO_{2-\partial}$, $Ce_xGd_yO_{2-\partial}$, $La_xSr_yCr_zO_{3-\partial}$, and mixtures thereof. Some non-limitative examples of cermets which may be suitable for an anode include at least one of Ni-YSZ, Cu-YSZ, Ni-SDC, Ni-GDC, Cu-SDC, Cu-GDC, and mixtures thereof.

Some non-limitative examples of metals which may be suitable for a cathode include at least one of silver, platinum and mixtures thereof. Some non-limitative examples of ceramics which may be suitable for a cathode include at least one of $Sm_xSr_yCoO_{3-\partial}$, $Ba_xLa_yCoO_{3-\partial}$, and $Gd_xSr_yCoO_{3-\partial}$.

The fuel flow 106 may contain a hydrocarbon fuel suitable for generating electricity in a dual chamber fuel cell, for example, methane ($CH_4$) 116, hydrogen ($H_2$) 118, or other hydrocarbon fuels suited to particular electrode compositions used in fuel cells, i.e., ethane, butane, propane, natural gas, methanol, and even gasoline. Methane 116 and hydrogen 118 are shown in the illustration as representative fuels.

At the anode 110, the methane 116 adsorbs to the anode surface(s), which are usually porous, and diffuses toward the anode-electrolyte interface 120. At the cathode 112, oxidizer molecules, such as oxygen ($O_2$), adsorb to the surface(s) of the cathode 112, which is also usually porous, and diffuse toward the cathode-electrolyte interface 124.

As the oxygen molecules 122 diffuse toward the cathode-electrolyte interface 124, they become exposed to incoming electrons from the cell's external electrical circuit 126, and capture the electrons to become oxygen anions ($O_2-$) 128. The oxygen anions 128 migrate by toward the positively biased anode-electrolyte interface 120. When the oxygen anions 128 and the methane 116 (or other fuel) meet (130) at the anode-electrolyte interface 120, the methane 116 combines with oxygen anions 128—an oxidation reaction—to form reaction products, such as water 132 and carbon dioxide 134. Electrons are left over once the reaction products have formed. Two electrons are lost each time an oxygen anion 128 combines with either a carbon atom or two hydrogen atoms of the methane. The lost electrons are the source of the electric current that may be harnessed via the cell's external electrical circuit 126. The water 132 and carbon dioxide 134 diffuse toward the outer surface(s) of the anode 110 and return to the stream of fuel flow 106.

The hydrogen 118 undergoes an oxidation similar to that of the methane 116. Molecules of hydrogen 118 adsorb onto the surface(s) of the anode 110 and diffuse toward the anode-electrolyte interface 120. At or near the interface, a molecule of hydrogen 118 combines (136) with an oxygen anion 128 to form water 132. Two electrons are freed for each oxygen anion 128 used in the reaction. The water migrates out of the anode 110 and back into the stream of the fuel flow 106.

The fuel flow 106 and the oxidizer flow 108 are introduced into the anode chamber 102 and the cathode chamber 104, respectively, under slight pressure. When each of the flow streams has passed over their respective electrodes, there is no seal barrier isolating the two flow streams. It should be noted that if the fuel is explosive, the anode chamber 102 and the cathode chamber 104 can be scaled, if necessary, to minimize their volume.

At the boundary where the fuel flow 106 and the oxidizer flow 108 meet and would begin to mix in the absence of a seal separating the anode chamber 102 and the cathode chamber 104, a combustor 138 is positioned to neutralize the fuel flow 106 and/or the oxidizer flow 108. Both the fuel flow 106 and the oxidizer flow 108 pass to (or pass partly through) the combustor 138 before having the opportunity to flow to an unintended electrode. In one implementation, the combustor 138 catalyzes an oxidation reaction between the fuel and oxidizer, thereby neutralizing the fuel and oxidizer into, e.g., carbon dioxide and water, which are then free to flow out of the exemplary no-seal fuel cell 100, or migrate toward the electrodes. Although the exhaust 140 is likely to exit the exemplary no-seal fuel cell 100, some of the water 132 and carbon dioxide 134 oxidation products may reach one of the electrodes via backflow or diffusion, but this is harmless to the operation of the exemplary no-seal fuel cell 100, causing at most minor dilution of the fuel flow 106 and/or the oxidizer flow 108.

The combustor 138, in the above described implementation, is thus a gas permeable catalytic mesh positioned adjacent to the fuel cell stack (110, 112, 114) and capable of forming a boundary between the fuel cell stack and one or more walls of the exemplary no-seal fuel cell 100. Fuel, oxidizer, and combustible gases emitted by the exemplary no-seal fuel cell 100 arrive at the boundary and react with one or more catalysts included in (and/or on) the gas permeable catalytic mesh combustor 138.

Figure 2:
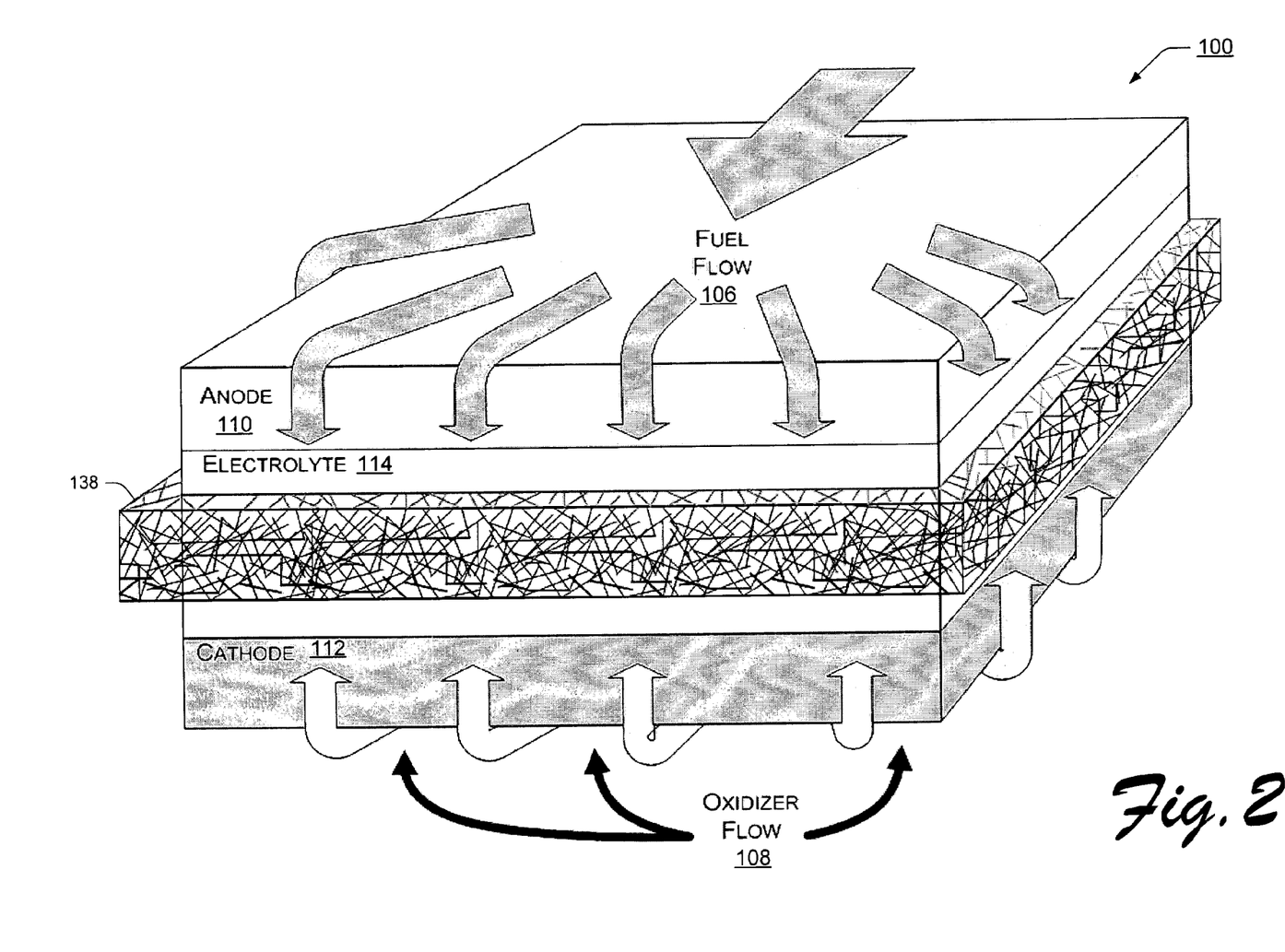
FIG. 2 is a graphic representation of an exemplary fuel cell having a gas-permeable combustor attached to the electrolyte, according to one aspect of the subject matter.

FIG. 2 shows a three-dimensional view of the exemplary no-seal dual chamber fuel cell 100 of FIG. 1. In this implementation, the anode 110, cathode 112, and electrolyte 114 are arranged in a stack or "sandwich" design with the fuel flow 106 streaming across the face of the anode 110 and the oxidizer flow 108 streaming across the face of the cathode 112. The fuel flow 106 and oxidizer flow 108 are contained by the anode chamber 102 (shown in FIG. 1) and the cathode chamber 104 (shown in FIG. 1) which are joined, but roughly delineated by the presence of the combustor 138, to form a continuous space in the exemplary no-seal fuel cell 100.

The combustor 138 is an area of a no-seal fuel cell 100 that roughly delineates an anode chamber 102 and a cathode chamber 104 (or more precisely, roughly delineates a anode fuel flow 106 and a cathode oxidizer flow 108) allowing at least some mixing of the fuel from the anode chamber 102 with an oxidizer from the cathode chamber 104 and allowing at least some combustion of the mixed fuel and oxidizer. The combustor 138 can be almost unnoticeable, such as a single wire or a "spark plug" point, or can be more noticeable, resembling a conventional fuel cell seal, save for gas permeability, such as a gasket-like gas-permeable membrane or wall.

In various implementations, the combustor 138 can be a combustion point made of a highly activated catalyst; a deposited catalyst powder; one or more wires or wire mesh; a coated area of a flow chamber; a catalyst held in place by a support material, such as a gas-permeable mesh of support material with catalytic powder deposited on the surface; a porous solid; an array of tubules, grains of catalyst; etc. The support material can be a solid surface, a mesh, a honeycomb monolith, an extension of an electrolyte or electrode, etc. The support material can be made of a ceramic, a cermet, an alloy, an electrode material, a solid oxide electrolyte material, etc. In one implementation, the combustor is a porous ceramic monolith of cordierite ($2AL_2O_3.2MgO.5SiO_2$) or other suitable ceramic material with a washcoat of gamma alumina and a cerium oxide ($CeO_2$) modifier. One or more of platinum, rhodium, palladium, ruthenium, nickel, gold, manganese, and copper may be deposited on the monolith and sintered onto the surface. In another implementation, a combustor 138 for generic use may be only platinum on YSZ.

The combustor 138, as mentioned, may be made entirely of a catalyst or may be partly catalyst and partly non-catalyst, such as non-catalyst support material. Thus, the combustor 138 can be made entirely of platinum, rhodium, palladium, ruthenium, gold, nickel, manganese and/or copper, either alone, in combination, or deposited and/or sintered onto abovementioned support materials. A combustor 138 may also include alloys, oxides, and cermets of the abovementioned metals as well as many other catalyst and support materials such as $Al_2O_3$, $CeO_2$, $TiO_2$ and solid oxide electrolytes.

In one variation, a catalytic combustor 138 may take the form of "steel wool textured" mesh that can be shaped to fill spaces, and that has high surface area, but does not significantly block the flow of gases, unless some blockage is intended in order to cause a backpressure in one of the electrode compartments. ("Backpressure" as used here means additional pressure between the combustor and one of the flow inlets.) The mesh, of course, can be made of metal, metal alloy, cermet, and/or a substrate surfaced with the metal(s), alloy(s), cermet(s), etc.

In one implementation, the combustor 138 is attached and supported only by the electrolyte 114. This is useful if the combustor 138 is an electrical conductor and insulation via the electrolyte 114 is desired. An electrolyte 114 of the solid oxide type can then be used having ceramic and metal oxide properties, and therefore a nonconductor in many aspects, i.e., an electrical insulator. Attachment of such an electrically conducting combustor 138 to only the electrolyte 114 prevents possible electrical shorting between the anode 110 and cathode 112 through the combustor 138. Typically the combustor 138 extends from an attachment to an element of the fuel cell stack, such as the electrolyte 114 or an electrode, to a wall of a flow chamber, so that there is no path for one of the gas flows to pass to an unintended electrode, except through the combustor 138.

In some implementations, an exemplary combustor 138 attached to the electrolyte 114 provides the secondary benefit of heating the electrolyte 114 and/or the entire anode-electrolyte-cathode stack. When the combustor 138 is catalytically oxidizing the left-over fuel flow 106 and oxidizer flow 108 it acts as a catalytic heater, e.g., wrapped around the stack. If the exemplary no-seal fuel cell 100 is of a type that benefits from high temperature, the combustor 138 can act like a "lit flame" to directly heat the stack.

Figure 3:
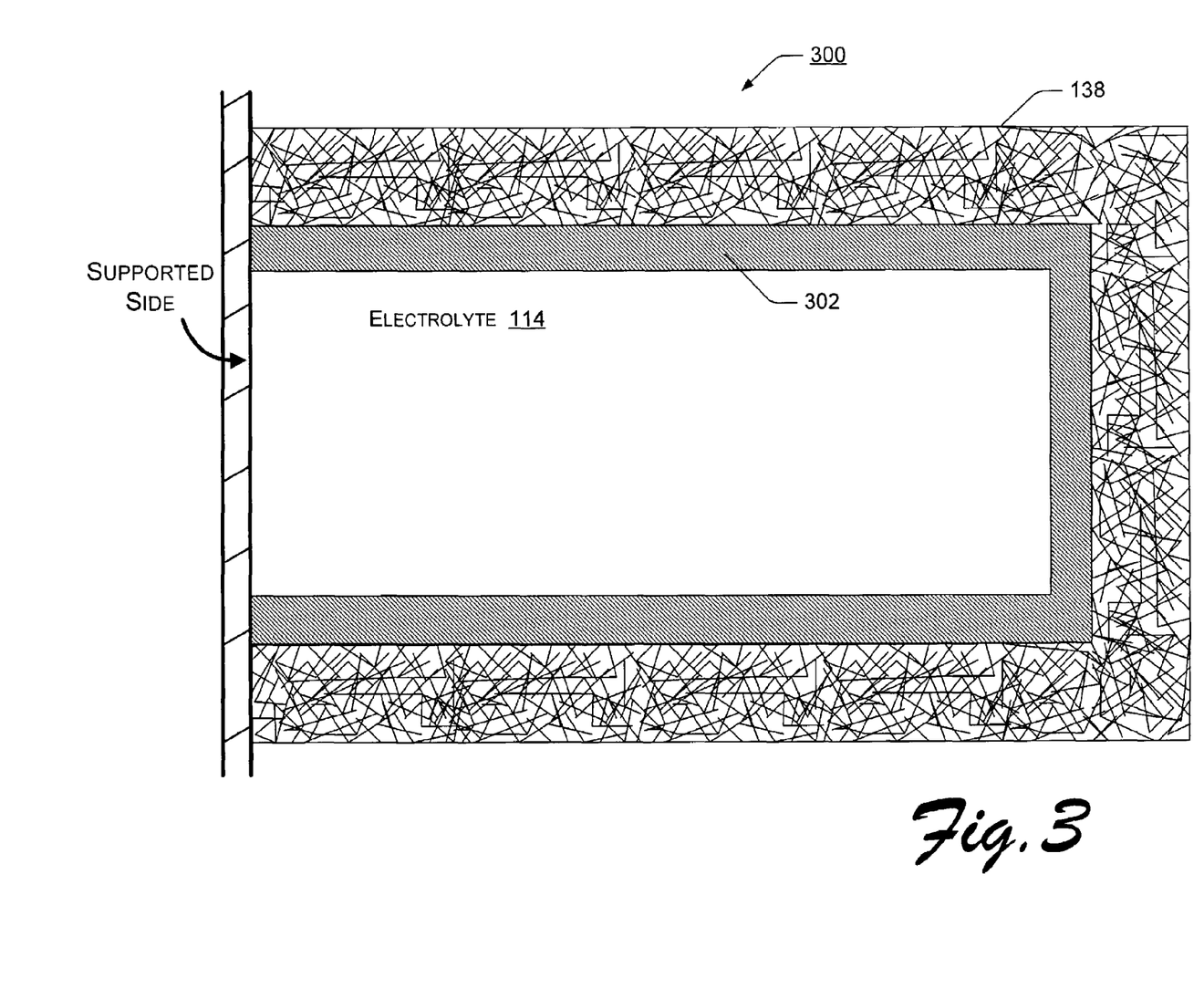
FIG. 3 is a graphic representation of an exemplary fuel cell having a gas-permeable combustor attached to an insulator, according to one aspect of the subject matter.

FIG. 3 shows a top view of an exemplary no-seal fuel cell 300 in which the combustor 138 is not attached directly to the electrolyte 114. Some combustors 138 may contain materials that detrimentally affect the electrolyte 114 and so contact with the electrolyte 114 is not desirable or, the electrical conductivity of certain implementations of the combustor 138 may not be suitable for contact with some electrolytes 114. Further, some combustors 138 may be too hot for contact with the electrolyte 114 or for contact with other parts of the exemplary no-seal fuel cell 300, especially if the no-seal fuel cell 300 is of the relatively low temperature variety (e.g., a bio fuel cell). A thermal and/or electrical insulator 302 may be used to support the combustor 138 while insulating the combustor 138 from other parts of the exemplary no-seal fuel cell 300.

An anode-electrolyte-cathode stack having an attached combustor 138 can be supported in its flow chamber(s) by any one of the combustor 138, the insulator 302, the electrolyte 114, an electrode (110, 112), or an electrical collector attached to the anode or cathode. If the stack is supported only on one side, then the stack with attached insulator 302 and attached combustor 138 is free to expand and contract in three dimensions, which may be important with multiple different materials having different coefficients of thermal expansion bonded to each other.

Figure 4:
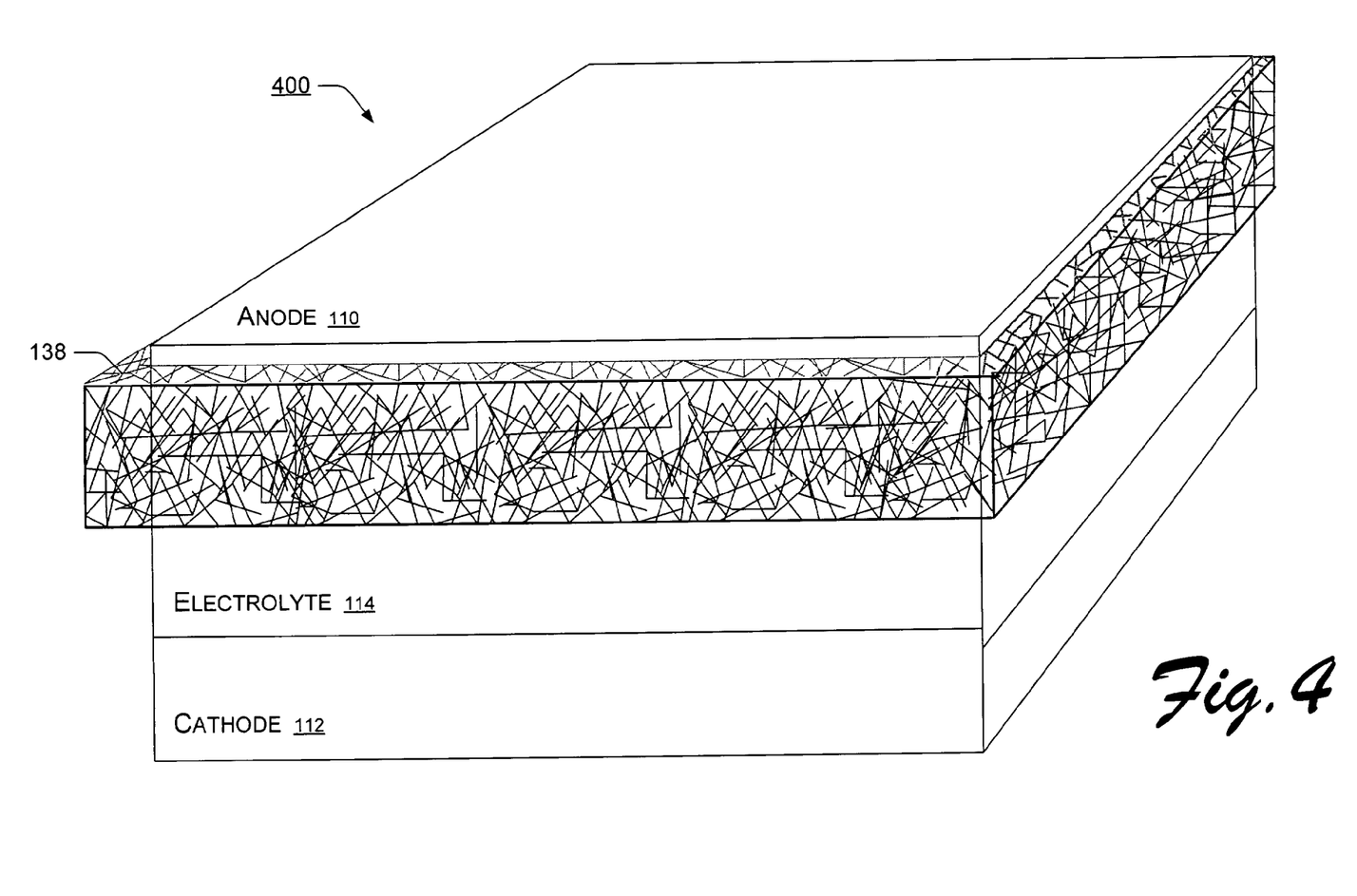
FIG. 4 is a graphic representation of an exemplary fuel cell having a gas-permeable combustor attached to the anode, according to one implementation of the subject matter.

Other design configurations can be used to integrate the combustor 138 into an exemplary no-seal dual chamber fuel cell 100, 200, 300. FIG. 4 shows an implementation of the exemplary no-seal dual chamber fuel cell 400 in which the combustor 138 is attached directly to the anode 110 and in direct thermal and electrical contact only with the anode 110. In this implementation, the combustor 138 may have catalyst element(s) added that enhance the electrochemical reactions of the anode 110. The catalyst element(s) facilitate these reactions by breaking down and reforming spent and/or unspent fuel components into more oxidizable fuel components for adsorption and electrochemical conversion to electricity. If the combustor 138 is an electrical conductor, then in some implementations the combustor 138 may provide electron sinking or other electronic influences that benefit the adsorption and/or electrochemical reactions that take place on or in the anode 110. For example, in one implementation, the combustor 138 collects electrostatic charges from a gas flowing over the physical surface(s) of the combustor 138 and donates electrons to the anode 110.

In some variations, as mentioned above, the combustor 138 may function as the support for the anode-electrolyte-cathode stack within the exemplary no-seal dual chamber fuel cell 400. In other variations, the combustor 138 may serve both as the support for the anode-electrolyte-cathode stack and as the electron collector connected between the anode 110 and the fuel cell's external electrical circuit.

Figure 5:
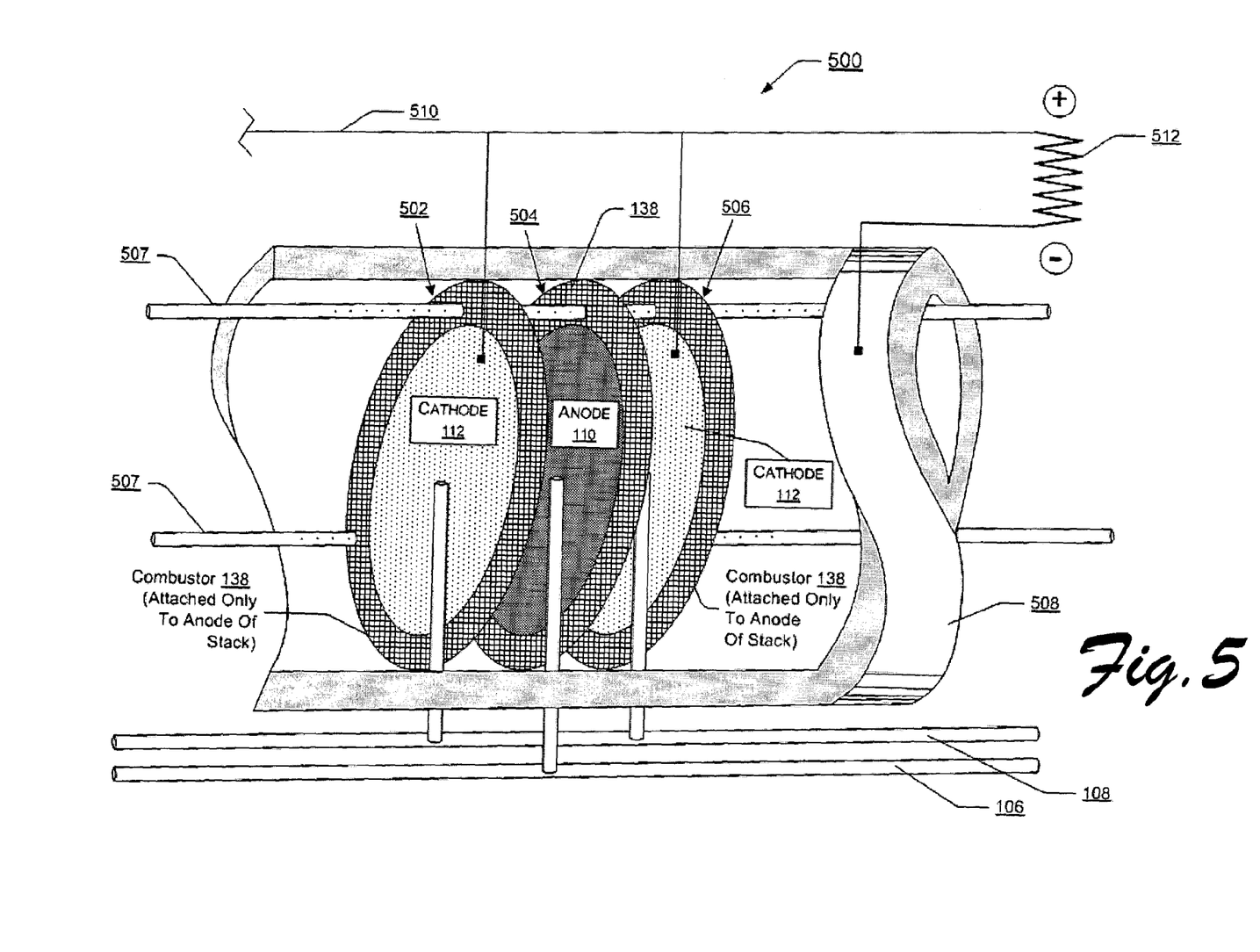
FIG. 5 is a graphic representation of an exemplary tubular fuel cell in which gas-permeable combustors support fuel cell stacks and provide electron collectors, according to one implementation of the subject matter.

FIG. 5 shows an exemplary no-seal array 500 of dual chamber anode-electrolyte-cathode stacks 502, 504, 506 in which each stack (502, 504, 506) is supported in a tubular flow chamber 508 only by a collar around the perimeter of each stack, wherein the collars have or are made of the combustor 138 and are attached only to the anodes 110 of each of the stacks 502, 504, 506. Fuel flow 106 enters between two adjacent disk-shaped anode-electrolyte-cathode stacks, e.g., 502, 504, that have anodes 110 facing the fuel flow 106. The fuel flow 106 is directed to the center of each anode 110 and flows radially toward the disk peripheries, where the "spent fuel" comes in contact with the combustor 138. Oxidizer flow 108 is introduced between two adjacent disk-shaped anode-electrolyte-cathode stacks 504, 506 that have cathodes 112 facing the oxidizer flow 108. The oxidizer flow 108 is directed to the center of each cathode 112 and flows radially toward the disk peripheries, where it also comes in contact with the combustor 138. When the "spent" fuel flow 106 and the "spent" oxidizer flow 108 meet at the combustor 138, they react together to from products such as carbon dioxide and water that are neutral to the electrochemical operation of the exemplary dual chamber no-seal array 500. The neutralized products may leave via ports or collection tubes 507 and/or can be drawn off.

In one implementation, the combustor 138 is not only the sole mechanism of physical support for each disk-shaped anode-electrolyte-cathode stack 502, 504, 506, but is also an electrical conductor attached only to the anode 110 of each stack and to the inside wall of the tubular flow chamber 508, which, in this implementation, is also an electrical conductor. The tubular flow chamber 508 thus acts as a collector for the each anode 110 in each stack, and the cathodes 112 of each stack have a common collector bus 510 coupled to the electrical circuit of the cell 512. Thus, the combustor 138 serves three roles: the role of neutralizing the fuel flow 106 and oxidizer flow 108 by catalytic oxidation to obviate the need for seals between anode and cathode compartments; the role of physically supporting the fuel cell stacks within the tubular flow chamber; and the role of providing electron collectors for the anodes 110 to participate in the cell's electrical circuit 512.

Figure 6:
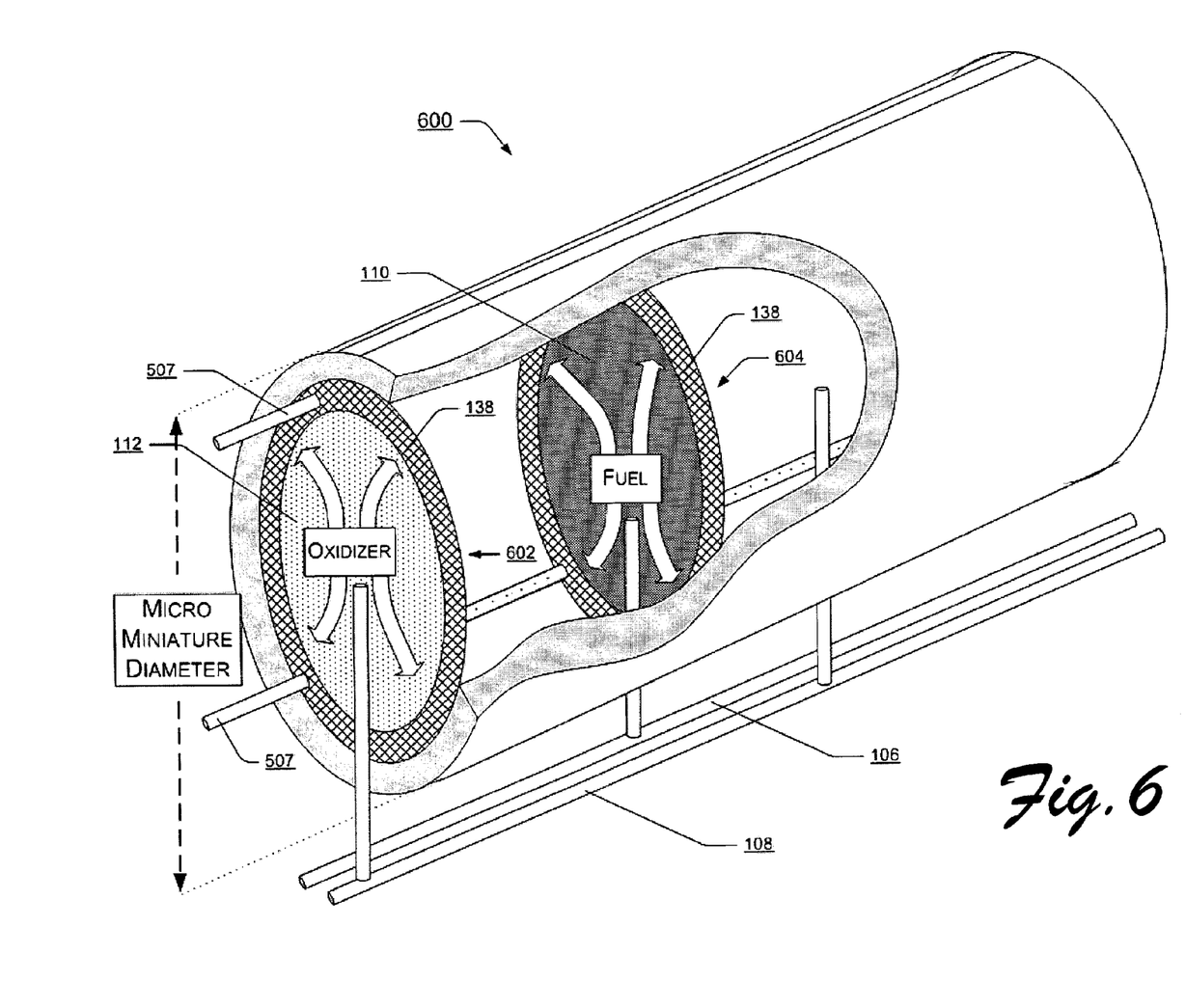
FIG. 6 is a graphic representation of an exemplary miniaturized tubular fuel cell having gas-permeable combustors, according to one implementation of the subject matter.

An exemplary combustor 138 used around the periphery of disk-shaped stacks also allows, as shown in FIG. 6, miniaturization of the exemplary no-seal fuel cell 600. The exemplary miniaturized no-seal fuel cell 600 (e.g., with a tubular diameter less than 1 millimeter, or even much smaller) has adjacent disk-shaped anode-electrolyte-cathode stacks 602, 604 mounted within the exemplary miniaturized no-seal fuel cell 600 (distance of separation between stacks may be greatly exaggerated). Each stack 602, 604 is supported in the fuel cell 600 only by a collar of the combustor 138, and the combustor 138 is attached only to the anode 110 of each stack 602, 604. Fuel flow 106 enters between two of the adjacent stacks 602, 604 that have anodes 110 facing the fuel flow 106. The fuel flow 106 is directed to the center of each anode 110 and flows radially toward the disk peripheries, where the "spent fuel" comes in contact with the combustor 138. Oxidizer flow 108 is introduced between two of the adjacent stacks (e.g., 602) that have cathodes 112 facing the oxidizer flow 108. The oxidizer flow 108 is directed to the center of each cathode 112 and flows radially toward the disk peripheries, where it also comes in contact with the combustor 138. When the "spent" fuel flow 106 and the "spent" oxidizer flow 108 meet at the combustor 138, they react together to from products such as carbon dioxide and water that are neutral to the electrochemical operation of the exemplary miniaturized dual chamber no-seal fuel cell 600. The neutralized products may leave via ports or collection tubes 507 and/or can be drawn off.

The combustor 138 used around the periphery of each stack allows the tiny disk-shaped anode-electrolyte-cathode stacks 602, 604 to be reduced in size without concern for the fuel and/or oxidizer flows migrating to poison electrodes. Small disks may not be able to tolerate such poisoning of their surface since they have so little surface to spare. The presence of the peripheral combustors 138 on tiny disk stacks 602, 604 allows the miniaturization of tubular and other types of no-seal fuel cells 600 beyond what can be achieved without combustors 138.

Figure 7:
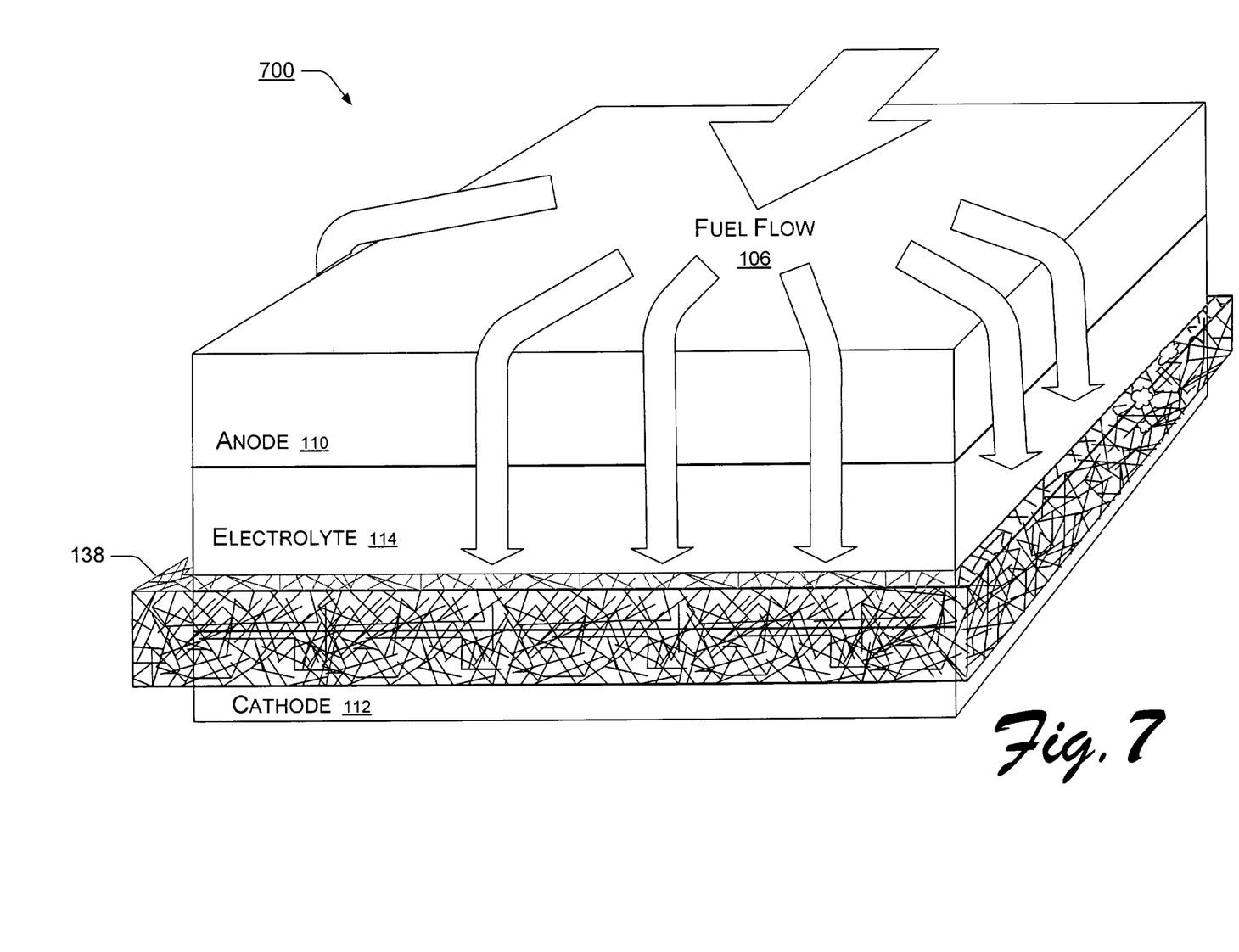
FIG. 7 is a graphic representation of an exemplary fuel cell having a gas-permeable combustor attached to the cathode, according to one implementation of the subject matter.

FIG. 7 shows an implementation of the exemplary no-seal dual chamber fuel cell 700 in which the combustor 138 is attached only with the cathode 112. The fuel flow 106 over the anode 110 may reach as far as the combustor 138 attached to the cathode 112 but is oxidized before fuel components can reach the surface of the cathode 112.

Having the combustor 138 attached to the cathode 112 may, depending on the catalytic properties of the cathode 112, assist the cathode 112 in the reduction of oxygen molecules into oxygen anions 128. If the combustor 138 is an electrical conductor, then in some implementations the combustor 138 may provide electron sinking or other electronic influences that benefit the adsorption and/or electrochemical reactions that take place on or in the cathode 112. In one implementation, the combustor 138 collects electrostatic charges from a gas flowing over the physical surface(s) of the combustor 138 and donates electrons to the cathode 112.

In some variations, the combustor 138 may function as the support for the anode-electrolyte-cathode stack within the exemplary no-seal dual chamber fuel cell 700 via support of the cathode 112. In other variations, the combustor 138 may serve not only as the physical support for the anode-electrolyte-cathode stack via the cathode 112, but also as the electron collector connected between the cathode 112 and the fuel cell's external electrical circuit.

Figure 8:
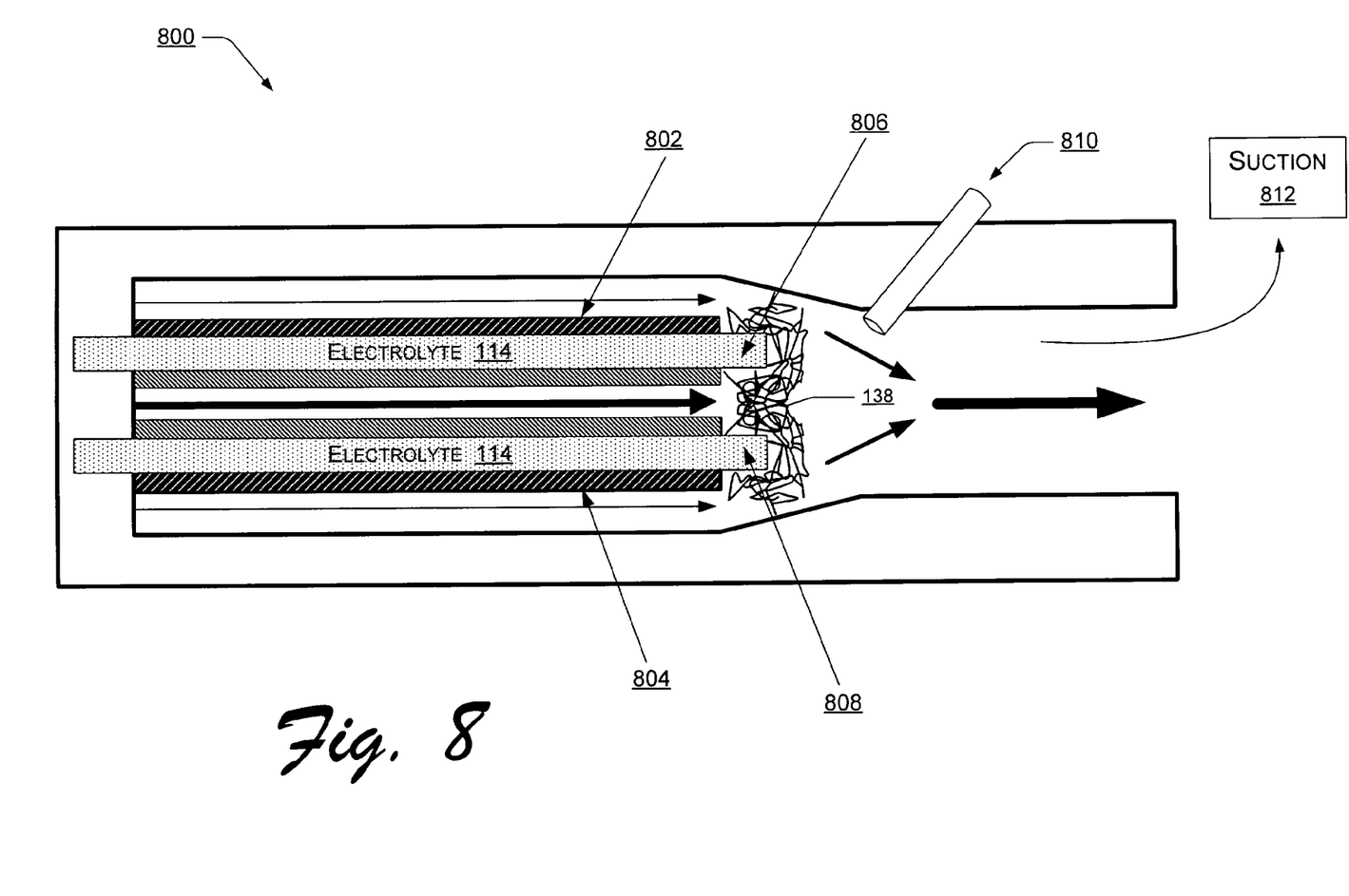
FIG. 8 is a diagram of an exemplary two-cell fuel cell having gas-permeable combustors, according to one implementation of the subject matter.

FIG. 8 shows an exemplary no-seal dual chamber fuel cell 800 that includes multiple anode-electrolyte-cathode stacks 802, 804. Each anode-electrolyte-cathode stack 802, 804 has an electrolyte layer 114. However, in this implementation the electrolyte layers 114 are too thin to attach the combustor 138 to the edge of the electrolytes 114. The ends of the electrolyte plates 806, 808 are therefore extended during manufacture beyond the corresponding ends of the electrodes so that the combustor 138 can be attached to the tops and/or bottoms of the exposed electrolyte plate ends 806, 808 instead of to the thin edge of the electrolyte 114.

An exemplary no-seal dual chamber fuel cell 800 can include a mechanism for providing extra oxidizer to the combustor 138. One or more ports 810 may be incorporated into the chamber design to supply oxidizer in the vicinity of the combustor 138. The oxidizer port 810 may also be an air injector, oxygen supply tube, and/or a branch line of the oxidizer flow 108 to the cathode 112.

In some implementations, the fuel flow 106, the oxidizer flow 108, as well as the exhaust flow of oxidation-reduction and combustion gas products may be assisted by suction 812 implemented at a flue or exhaust port of the exemplary no-seal fuel cell 800. The suction 812 may be provided by a pump, fan, and/or the siphoning action of a vertical exhaust chimney wherein hot exhaust gases rise through the chimney thereby providing suction.

Since the combustor 138 can form a boundary across the entire exhaust outlet paths of the anode chamber 102 and the cathode chamber 104, the combustor 138 can be used to partially impede the flow of the fuel and/or the oxidizer. Creating a resistance to the fuel flow 106, for example, can have the advantage of slowing down a fuel flow 106 so that less fuel is wasted if the rates of adsorption and diffusion for the fuel are slower than the rate of flow through the flow chamber. More particularly, the activity of the combustor 138 in oxidizing a fuel can be selected or tuned to the rate of fuel flow 106 that the combustor 138 allows. Hence, a combustor 138 that is not very active in oxidizing a fuel might also be physically situated in a flow chamber of the fuel cell to slow down the fuel flow 106. A very active combustor 138, on the other hand, might be physically disposed in a flow chamber to allow gas to pass very freely. In one implementation, the combustor 138 is a gas permeable catalytic gasket that has flow resistance that varies with respect to one or more dimensions. Hence, a single combustor 138 may be positioned to direct multiple flows within a fuel cell at once. Such a combustor 138 can be used to achieve proper and/or stochiometric mixing of the fuel flow 106 and the oxidizer flow 108 for catalysis.

Combustors 138, moreover, can be situated to cause a differential backpressure (additional pressure, as defined above) in the anode chamber and/or the cathode chamber. For example, perhaps oxidizer is plentiful as when air is used so that there is no need for backpressure on the cathode side, but the particular anode-fuel match consists of an anode 110 having anode materials and porosity that benefit when the selected fuel gas is applied under pressure. Or perhaps the fuel is a difficult fuel to adsorb or diffuse at the anode 110 and increased pressure on the anode side drives the electrochemical reactions of the fuel cell forward. The combustor(s) 138 used in an exemplary no-seal fuel cell 800 can be selected and/or situated to provide the desired backpressures in the anode chamber and/or the cathode chamber.

Figure 9:
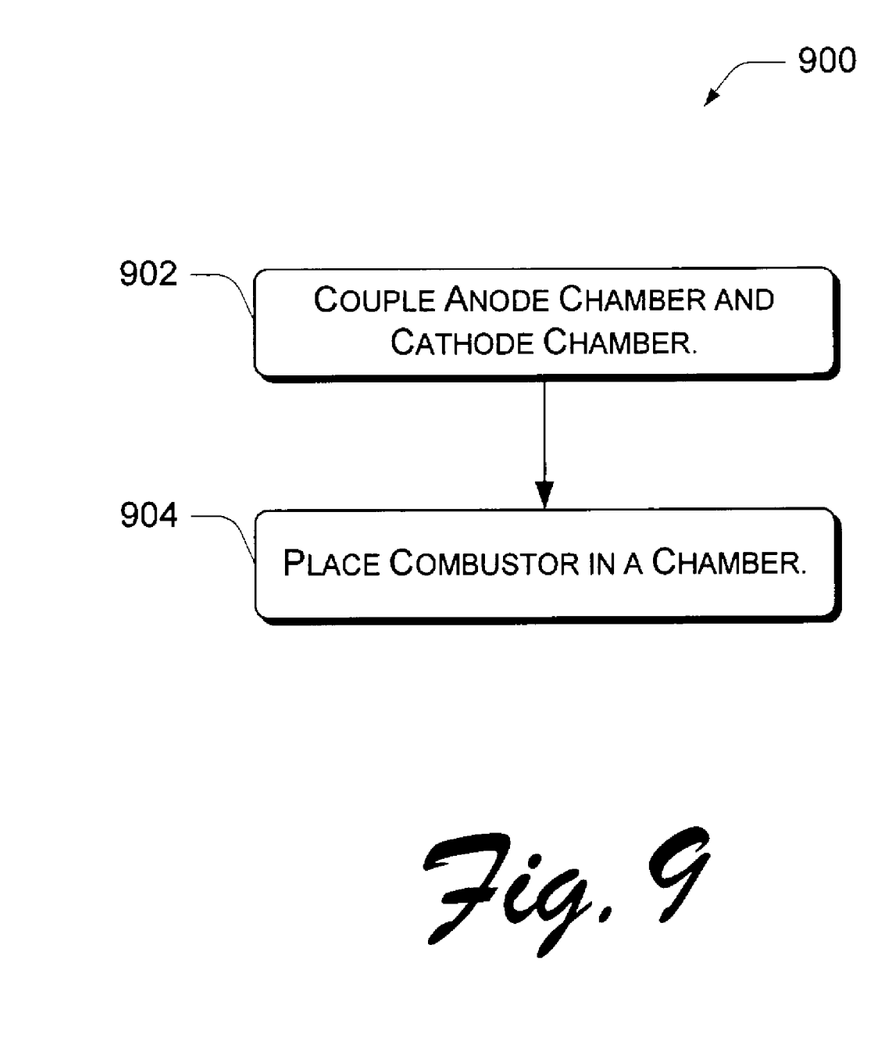
FIG. 9 is a flow diagram of an exemplary method of making a fuel cell having a gas-permeable combustor, according to one implementation of the invention.

FIG. 9 is an exemplary method 900 of making a no-seal fuel cell. In the flow diagram, the operations are summarized in individual blocks.

At block 902, an anode chamber and a cathode chamber are coupled to allow the free flow of gases between the anode chamber and the cathode chamber. From the standpoint of gas flow, the no-seal fuel cell has only a single combined flow chamber, since there are no seals between the two chambers.

At block 904, a combustor is placed in the no-seal fuel cell to neutralize the fuel flow and/or the oxidizer flow. For example, the combustor oxidizes the fuel into carbon dioxide and water before the fuel flow can reach the cathode and/or before the oxidizer flow can reach the anode, which would decrease the efficiency of the anode and cathode.

Figure 10:
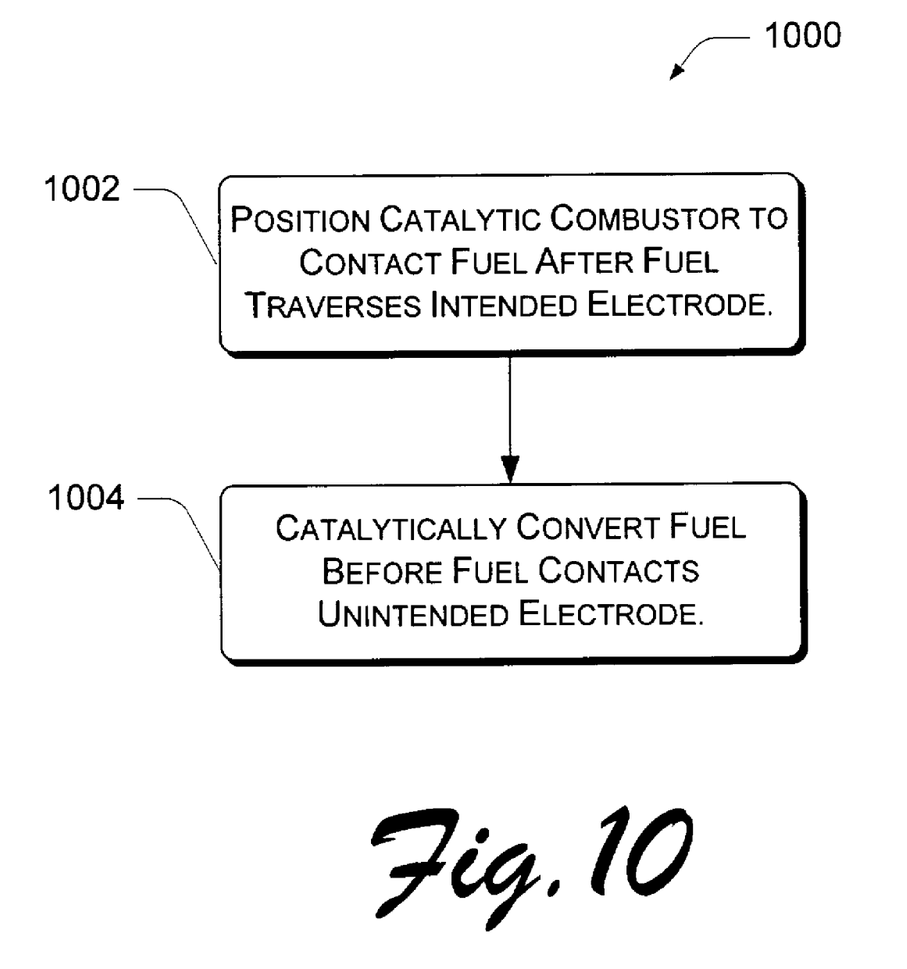
FIG. 10 is a flow diagram of an exemplary method of using a catalytic combustor as a seal in a fuel cell.

FIG. 10 is an exemplary method 1000 of using a catalytic combustor as a seal in a fuel cell having electrodes. In the flow diagram, the operations are summarized in individual blocks.

At block 902, a catalytic combustor is positioned to come in contact with fuel after the fuel has traversed a path over an intended electrode.

At block 904, the fuel is catalytically converted before the fuel can come in contact with an unintended electrode.

CONCLUSION

The foregoing discussion describes various exemplary no-seal fuel cells, and related methods. Although the invention has been described in language specific to structural features and/or methodological acts, it is to be understood that the subject matter defined in the appended claims is not necessarily limited to the specific features or acts described.

The invention claimed is:

1. A dual chamber fuel cell that includes a gas-permeable catalyic combustor instead of a seal, comprising:
   an anode chamber for presenting fuel to an anode;
   a cathode chamber for presenting oxidizer to a cathode, wherein the anode chamber and the cathode chamber are coupled to form a continuous space within the fuel cell;
   a gas-permeable catalytic combustor in at least part of the continuous space to react at least some of the fuel with at least some of the oxidizer;
   wherein the gas-permeable catalytic combustor is located where normally a seal between the anode chamber and the cathode chamber is situated; and
   wherein the gas-permeable catalytic combustor is in physical contact with the anode, the cathode, or an electrolyte of the fuel cell.

2. The dual chamber fuel cell as recited in claim 1, wherein the combustor reacts at least some of the fuel with at least some of the oxidizer before the fuel flows to the cathode.

3. The dual chamber fuel cell as recited in claim 1, wherein the combustor reacts at least some of the fuel with at least some of the oxidizer before the oxidizer flows to the anode.

4. The dual chamber fuel cell as recited in claim 1, wherein the combustor is a catalyst for reacting the fuel with the oxidizer.

5. The dual chamber fuel cell as recited in claim 4, wherein the combustor contains one of platinum, rhodium, ruthenium, palladium, nickel, copper, manganese, and gold.

6. The dual chamber fuel cell as recited in claim 4, wherein the combustor contains an alloy that includes one of platinum, rhodium, ruthenium, palladium, nickel, copper, manganese, and gold.

7. The dual chamber fuel cell as recited in claim 4, wherein the combustor contains an oxide of one of platinum, rhodium, ruthenium, palladium, nickel, copper, manganese, and gold.

8. The dual chamber fuel cell as recited in claim 4, wherein the combustor contains a cermet of one of platinum, rhodium, ruthenium, palladium, nickel, copper, manganese, and gold.

9. The dual chamber fuel cell as recited in claim 4, wherein the combustor contains one of $Al_2O_3$, $CeO_2$, $TiO_2$.

10. The dual chamber fuel cell as recited in claim 4, wherein the combustor contains a solid oxide electrolyte.

11. The dual chamber fuel cell as recited in claim 1, wherein the combustor allows a free flow of fuel and oxidizer.

12. The dual chamber fuel cell as recited in claim 1, further comprising an electrolyte having a first side and a second side and an edge side between the first side and the second side, wherein the anode is in contact with the first side, the cathode is in contact with the second side, and the combustor is attached to the fuel cell at the edge side of the electrolyte.

13. The dual chamber fuel cell as recited in claim 12, wherein the anode does not cover the entire first side, the cathode does not cover the entire second side, and the combustor is attached to the fuel cell at one of the first side and the second side of the electrolyte.

14. The dual chamber fuel cell as recited in claim 1, wherein the combustor is aft ached only to the anode.

15. The dual chamber fuel cell as recited in claim 14, wherein the combustor collects electrons from the anode.

16. The dual chamber fuel cell as recited in claim 14, wherein the combustor collects electrons and donates the electrons to the anode.

17. The dual chamber fuel cell of claim 15, wherein the combustor collects electrostatic charge from a gas flow passing over a surface of the combustor.

18. The dual chamber fuel cell as recited in claim 1, wherein the combustor is attached only to the cathode.

19. The dual chamber fuel cell as recited in claim 18, wherein the combustor collects electrons from the cathode.

20. The dual chamber fuel cell as recited in claim 18, wherein the combustor collects electrons and donates the electrons to the cathode.

21. The dual chamber fuel cell of claim 19, wherein the combustor collects electrostatic charge from a gas flow passing over a surface of the combustor.

22. The dual chamber fuel cell as recited in claim 1, wherein the combustor is attached to the surface of one of the anode chamber and the cathode chamber.

23. The dual chamber fuel cell as recited in claim 22, wherein the combustor is the only support for attaching the anode, cathode, and electrolyte to an outer wall of the fuel cell.

24. The dual chamber fuel cell as recited in claim 22, wherein:

a surface of the anode chamber conducts electricity and is used as a collector for the electrical circuit of the fuel cell;

the combustor conducts electricity;

the combustor is attached between the anode and the surface of the anode chamber; and the combustor collects electrons from the anode and conducts the electrons to the surface of the anode chamber.

25. The dual chamber fuel cell as recited in claim 22, wherein:

a surface of the cathode chamber conducts electricity and is used as a conductor for the electrical circuit of the fuel cell;

the combustor conducts electricity;

the combustor is attached between the cathode and the surface of the cathode chamber; and the combustor collects electrons from the cathode chamber and conducts the electrons to the cathode.

26. The dual chamber fuel cell as recited in claim 1, wherein the combustor is attached only to insulating material, wherein the insulating material is attached to one of the anode, the cathode, the electrolyte, and an airflow chamber.

27. The dual chamber fuel cell as recited in claim 1, wherein the combustor is in the form of a finely divided powder.

28. The dual chamber fuel cell as recited in claim 1, wherein the combustor is in the form of grains.

29. The dual chamber fuel cell as recited in claim 1, wherein the combustor is in the form of wire.

30. The dual chamber fuel cell as recited in claim 1, wherein the combustor has a porous form.

31. The dual chamber fuel cell as recited in claim 1, wherein the combustor impedes the flow of one of the fuel and the oxidizer to create a backpressure in one of the anode chamber and the cathode chamber.

32. The dual chamber fuel cell as recited in claim 1, wherein the fuel cell has an additional oxidizer inlet near the combustor to facilitate oxidation of at least some of the fuel.

33. The dual chamber fuel cell as recited in claim 1, further comprising a means of applying a vacuum to the continuous space to remove fuel oxidized by the combustor.

34. The dual chamber fuel cell as recited in claim 22, wherein the vacuum is provided by hot exhaust from the fuel cell rising in an exhaust channel to provide siphoning.

35. The dual chamber fuel cell as recited in claim 1, wherein the combustor heats one of the electrolyte, the anode, and the cathode.

* * * * *

UNITED STATES PATENT AND TRADEMARK OFFICE
CERTIFICATE OF CORRECTION

PATENT NO.         : 7,405,018 B2
APPLICATION NO.    : 10/367464
DATED              : July 29, 2008
INVENTOR(S)        : David Champion et al.

It is certified that error appears in the above-identified patent and that said Letters Patent is hereby corrected as shown below:

In column 3, line 30, delete "$_{La_x}Sr_yCr_zO_{3-\partial}$," and insert -- $La_xSr_yCr_zO_{3-\partial}$, --, therefor.

In column 3, line 56, delete "$(O_2^-)$" and insert -- $(O^{2-})$ --, therefor.

In column 9, line 51, in Claim 1, delete "catalyic" and insert -- catalytic --, therefor.

In column 10, line 39, in Claim 14, delete "aft ached" and insert -- attached --, therefor.

Signed and Sealed this

Twenty-first Day of April, 2009

JOHN DOLL
*Acting Director of the United States Patent and Trademark Office*